United States Patent [19]
Oriani et al.

[11] Patent Number: 5,574,092
[45] Date of Patent: Nov. 12, 1996

[54] THERMOPLASTIC POLYURETHANES CONTAINING UNITS DERIVED FROM AN AROMATIC DIOL

[75] Inventors: Steven R. Oriani, Houston, Tex.; Richard W. Oertel, Midland, Mich.

[73] Assignee: The Dow Chemical Company, Midland, Mich.

[21] Appl. No.: 533,888

[22] Filed: Sep. 26, 1995

[51] Int. Cl.⁶ .............................. C08J 3/00; C08K 3/20; C08L 75/00; C08G 18/00
[52] U.S. Cl. ............................. 524/590; 528/44; 528/74; 528/85; 528/86
[58] Field of Search ............................. 524/590; 528/44, 528/74, 85, 86

[56] References Cited

U.S. PATENT DOCUMENTS

| | | | |
|---|---|---|---|
| 4,371,684 | 2/1983 | Quiring et al. | 528/65 |
| 4,376,834 | 3/1983 | Goldwasser et al. | 521/159 |
| 4,385,133 | 5/1983 | Alberino et al. | 521/159 |
| 4,522,975 | 6/1985 | O'Connor et al. | 524/702 |
| 4,567,236 | 1/1986 | Goldwasser et al. | 525/127 |
| 4,701,477 | 10/1987 | Altenberg et al. | 521/167 |
| 5,167,899 | 12/1992 | Jezic | 264/510 |

OTHER PUBLICATIONS

Odian, G., Principles of Polymerization, 1981, pp. 28–29.
Saunders, et al., *Polyurethanes, Chemistry and Technology*, Part 1, pp. 228–232 (1963).
Ulrich, *Kirk–Othmer: Encyclopedia of Chemical Technology*, vol. 23, 3rd Edition, p. 598 (1983).

*Primary Examiner*—Paul R. Michl
*Assistant Examiner*—Patrick Niland
*Attorney, Agent, or Firm*—Reid S. Willis

[57] ABSTRACT

The present invention is a rigid thermoplastic polyurethane having a $T_g$ of at least 50° C. having a sufficient concentration of units derived from an aromatic diol to lower the temperature at which the rigid thermoplastic polyurethane can be melt processed. The present invention is also a thermoplastic polyurethane with a flex modulus of at least 100,000 psi, and having a sufficient concentration of units derived from an aromatic diol to lower the temperature at which the thermoplastic polyurethane can be melt processed. The compositions of the present invention show improved processability with insubstantial loss of physical properties.

16 Claims, No Drawings

THERMOPLASTIC POLYURETHANES CONTAINING UNITS DERIVED FROM AN AROMATIC DIOL

BACKGROUND OF THE INVENTION

High molecular weight RTPU's are single- or two-phase polymers that can be prepared by the reaction of approximately stoichiometric amounts of a low molecular weight diol chain extender (molecular weight of not more than 300) and optionally a high molecular weight diol (molecular weight generally in the range of from about 500 to about 8000) with a diisocyanate. These RTPU's have a glass transition temperature ($T_g$) of not less than 50° C. and typically have a hard segment content of not less than 75 percent. The disclosure and preparation of RTPU's is described, for example, by Goldwasser et al. in U.S. Pat. No. 4,376,834, incorporated herein by reference.

Because RTPU's tend to have a weight average molecular weight greater than 200,000 and a capacity for intermolecular hydrogen bonding, these polymers require very high thermal and/or mechanical energy input to generate the homogeneous, plasticated melt needed for thermoplastic forming processes such as injection molding or extrusion. The requirement for high energy input in the melting/plasticating stages may stall the screw of an injection molding machine or extruder, or may result in localized overheating of material due to high shear in the transition zone of the screw, which in turn causes polymer degradation and splay defects in the molded part.

One method for overcoming these processing problems is to incorporate a chain stopper such as a monofunctional alcohol into the formulation, as disclosed by Quiring in U.S. Pat. No. 4,371,684, incorporated herein by reference. Unfortunately, physical properties of the RTPU product, such as $T_g$ and toughness, suffer at the expense of improved processability. Alternatively, urethane molecular weight can be reduced by deliberately polymerizing with a deficiency of isocyanate (that is, an excess of hydroxyl groups). As disclosed by Ulrich in "Kirk-Othmer: Encyclopedia of Chemical Technology", Vol. 23, 3rd Ed., p. 598 (1983), such products are preferred for use in extrusion processes. However, in practice, the molecular weight of the polymer may be very difficult to control for some large scale manufacturing processes using this off-ratio approach. It is therefore desirable to find a practical way to improve processability of RTPU's without sacrificing physical properties.

SUMMARY OF THE INVENTION

The present invention is a rigid thermoplastic polyurethane having a $T_g$ of at least 50° C. and further having a sufficient concentration of units derived from an aromatic diol to lower the temperature at which the rigid thermoplastic polyurethane can be melt processed. In another aspect, the present invention is a thermoplastic polyurethane having a flex modulus of at least 100,000 psi, and further having a sufficient concentration of units derived from an aromatic diol to lower the temperature at which the thermoplastic polyurethane can be melt processed. The compositions of the present invention show improved processability with insubstantial loss of physical properties.

DETAILED DESCRIPTION OF THE INVENTION

The RTPU of the present invention contains a hard segment derived from the reaction of a diisocyanate, a diol chain extender having a molecular weight of not more than 300, and an aromatic diol. The term aromatic diol is used herein to describe an aromatic or heteroaromatic moiety having two OH groups attached to the aromatic carbon atoms. The hard segment content of the RTPU is sufficiently high to produce a resin having a $T_g$ of greater than 50° C., and preferably constitutes from about 75, more preferably from about 90, to about 100 weight percent of the RTPU.

A thermoplastic polyurethane that is not by definition an RTPU may be used in the present invention provided sufficient amounts of suitable fillers, reinforcing fibers, or other thermoplastic materials are added to achieve a flex modulus of at least 100,000 psi. Suitable fillers include talc, silica, mica, or glass beads, or mixtures thereof; suitable reinforcing fibers include glass, carbon, or graphite fibers, or mixtures thereof; and suitable thermoplastics include acrylonitrile-butadiene-styrene, polyacetal, nylon, polybutylene terephthalate, polyethylene terephthalate, ionomers, and the like. As used herein, the term "TPU" refers to a rigid TPU or a TPU having a flex modulus of at least 100,000 psi.

The aromatic diol generally has a molecular weight of not more than 500. Examples of aromatic diols include, but are not restricted to, resorcinol, catechol, hydroquinone, dihydroxynaphthalenes, dihydroxyanthracenes, bis(hydroxyaryl) fluorenes, dihydroxyphenanthrenes, dihydroxybiphenyls; and bis(hydroxyphenyl) propanes. Preferred aromatic diols include hydroquinone, 4,4'-dihydroxybiphenyl, 9,9-bis(4-hydroxy-phenyl) fluorene, and bisphenol A.

Preferred diisocyanates include aromatic, aliphatic, and cycloaliphatic diisocyanates and combinations thereof. Representative examples of these preferred diisocyanates can be found, for example, in U.S. Pat. Nos. 4,385,133; 4,522,975; and 5,167,899, all incorporated herein by reference. More preferred diisocyanates include 4,4'-diisocyanatodiphenylmethane, p-phenylene diisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanatodicyclohexylmethane and 4,4'-diisocyanatodiphenylmethane. Most preferred is 4,4'-diisocyanatodiphenylmethane.

Preferred diol chain extenders are ethylene glycol, 1,3-propanediol, 1,4-butanediol, 1,5-pentanediol, 1,6-hexanediol, diethylene glycol, triethylene glycol, tripropylene glycol, tetraethylene glycol, neopentyl glycol, 1,4-cyclohexanediol, 1,4-cyclohexanedimethanol, 1,4-bishydroxy-ethylhydroquinone, 2,2-bis(β-hydroxy-4-ethoxyphenyl)propane (i.e., ethoxylated bisphenol A), and mixtures thereof. More preferred chain extenders are 1,4-butanediol, 1,6-hexanediol, 1,4-cyclohexanedimethanol, diethylene glycol, triethylene glycol, tripropylene glycol, and mixtures thereof.

The RTPU may optionally contain blocks derived from a high molecular weight glycol having a molecular weight in the range from about 750, preferably from about 1000, and more preferably from about 1500, to about 8000, preferably to about 6000, and more preferably to about 5000. These high molecular weight glycol blocks constitute a sufficiently low fraction of the RTPU such that the $T_g$ of the RTPU is above 50° C. Preferably, the high molecular weight glycol blocks constitute from about 25, and more preferably from about 10, to about 0 weight percent of the RTPU.

The high molecular weight glycol is preferably a polyester glycol or a polyether glycol or a combination thereof. Examples of preferred polyester glycols and polyether glycols include polycaprolactone glycol, polyoxyethylene glycol, polyoxypropylene glycol, polyoxytetramethylene glycol, polyethylene adipate, polybutylene adipate, polyethylenebutylene adipate, and poly(hexamethylene carbonate glycol), or combinations thereof.

The isocyanate to OH ratio of the reactants varies from about 0.95:1, preferably from about 0.975:1, and more preferably from about 0.985:1, to about 1.05:1, preferably to about 1.025:1, and more preferably to about 1.015:1.

The amount of the aromatic diol used to prepare the TPU is sufficient to lower the temperature at which the TPU can be melt processed. In general, the concentration of the aromatic diol will not exceed that amount which causes the tensile elongation at break of the TPU to be less than 5%, as determined by ASTM D-638. Preferably, the concentration of the aromatic diol is in the range of from about 0.1, more preferably from about 0.5, and most preferably from about 2 mole percent, to preferably about 15, more preferably about 10, and most preferably about 5 mole percent, based on the total moles of diol used to prepare the TPU. Preferably, the temperature at which the TPU is processed is lowered by at least 5° C., more preferably by at least 10° C., and most preferably by at least 20° C. by the presence of the aromatic diol.

The polymerization process is usually carried out in the presence of a catalyst that promotes the reaction between isocyanate groups and hydroxy groups. Examples of suitable catalysts can be found in Saunders et al., Polyurethanes, Chemistry and Technology, Part I, pp. 228–232 (1963). Such catalysts include organic and inorganic acid salts and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative tertiary organic amines include triethylamine, triethylenediamine, N,N,N',N'-tetramethylethylenediamine, N,N,N',N'-tetraethylethylenediamine, N-methylmorpholine, N,N-dimethanolamine, N,N-diethanolamine, and the like. Preferred catalysts are tetravalent or divalent organotin compounds such as di-n-butyltin diacetate, dimethyltin dimercaptide, dibutyltin dilaurate, stannous oleate, and stannous octoate. The amount of catalyst used is generally in the range of 0.02 to about 2 weight percent, based on the weight of the total polymer. The compositions of the present invention can also incorporate various additives, such as antioxidants, fire retardants, impact modifiers (as disclosed, for example, in U.S. Pat. No. 4,567,236, incorporated herein by reference), plasticizers, and the like commonly used in the art in such compositions.

The following example is for illustrative purposes only and is not meant to limit the scope of the invention.

EXAMPLE 1

Preparation of RTPU's Containing Units Derived from Bisphenol A

An RTPU is prepared by weighing the appropriate amounts of the diols plus 0.2% by weight IRGANOX™ 1010 stabilizer (Trademark of Ciba-Geigy), based on the weight of the diols and the diisocyanate, into a 1000 mL kettle. These ingredients are heated to between 80° and 100° C., and stripped under vacuum to remove water. After approximately 1 hour of stripping, the hydroxy terminated ingredients are mixed vigorously with diphenyl methane diisocyanate and the hot polymer is poured into pans for cooling. Each cast consists of a total of 375 g of polymer, catalyzed by 1 drop of FOMREZ™ UL-28 catalyst (Trademark of Witco Corp.). In all cases, the NCO/OH ratio is constant at 1.005.

As shown in Table I, the polymer based on a combination of 98 mole percent 1,4-cyclohexanedimethanol (CHDM) and 2 mole percent bisphenol A (BPA) exhibits a processing temperature that is 10°–20° C. lower than the processing temperatures required for a 100% CHDM based polymer. The polymer based on a combination of 96 mole percent 1,6 hexanediol (HDO) and 4 mole percent BPA exhibits a similar effect, as shown in Table II. A further benefit of the addition of the BPA in each case is that the holding pressure required to fully pack the mold is reduced by over 200 psi. Also, the percent tensile elongation of the polymers containing BPA is maintained at acceptable levels.

TABLE I

The Effect of 2 Percent Bisphenol A on RTPU Processing Temperatures

| Total diol | 100% CHDM | 98% CHDM/2% BPA |
| --- | --- | --- |
| Zone 1 processing T (°C.) | 230 | 210 |
| Zone 2 processing T (°C.) | 230 | 220 |
| Zone 3 processing T (°C.) | 235 | 220 |
| Tensile Elongation | 100% | 63% |
| Holding pressure | 920 psi | 700 psi |

TABLE II

The Effect of 4 Percent Bisphenol A on RTPU Processing Temperature

| Total diol | 100% HDO | 96% HDO/4% BPA |
| --- | --- | --- |
| Zone 1 processing T (°C.) | 200 | 180 |
| Zone 2 processing T (°C.) | 210 | 190 |
| Zone 3 processing T (°C.) | 210 | 190 |
| Tensile Elongation | 137% | 162% |
| Holding pressure | 900 psi | 675 psi |

By comparison, 2 mole percent of the aliphatic monoalcohol, stearyl alcohol (SA), also reduces the processing temperature by about the same amount. In contrast, as illustrated in Comparison Table A, whereas the presence of 2 mole percent BPA reduces the deflection temperature under load (DTUL) for a formulation containing HDO by only about 2° C., the same amount of SA reduces the DTUL by over 10° C. Similar results are observed when 4 mole percent BPA or SA is present in a formulation containing CHDM.

Comparison Table A - Comparison of Change in RTPU Deflection Temperatures Under Load: Stearyl Alcohol vs Bisphenol A.

| Formulation | DTUL* (°C.) 66 psi | DTUL (°C.) 264 psi |
| --- | --- | --- |
| 100% HDO | 89 | 76 |
| 96% HDO, 4% BPA | 87 | 74 |
| 96% HDO, 4% SA | 77 | 67 |
| 100% CHDM | 134 | 119 |
| 98% CHDM, 2% BPA | 132 | 118 |
| 98% CHDM, 2% SA | 123 | 107 |

*as determined by ASTM D-648 using 0.32 cm thick specimens

Whereas the presence of the monofunctional alcohol diminishes important physical properties, the presence of the aromatic diol improves processability without deleteriously affecting such properties. Although not bound by theory, it is believed that the presence of the monofunctional alcohol acts as a chain terminator in limiting molecular weight growth during polymerization; thus, a reduction of polymer processing temperature is accomplished by a reduction of polymer molecular weight, which can be detrimental to the physical properties of the polymer in some cases. The reduced processing temperatures coupled with virtually undiminished physical properties for the aromatic diol units can be explained as follows. The units derived from aromatic diols that are formed in the polymerization process (aromatic urethane units) are apparently more thermally labile than units derived from aliphatic diols (aliphatic urethanes). Thus, these aromatic urethanes cleave at lower temperatures than the aliphatic urethanes, resulting in a less viscous polymeric material that is processable at lower temperatures without reduction in final polymer molecular weight.

What is claimed is:

1. A rigid thermoplastic polyurethane comprising a sufficient concentration of units of an aromatic diol selected from the group consisting of resorcinol, catechol, hydroquinone, dihydroxynaphthalenes, dihydroxyanthracenes, bis(hydroxyaryl) fluorenes, dihydroxyphenanthrenes, dihydroxybiphenyls, and bis(hydroxyphenyl) propanes to lower the temperature at which the rigid thermoplastic polyurethane can be melt processed, wherein the thermoplastic polyurethane has a $T_g$ of at least 50° C.; and with the proviso that the concentration of the units of the aromatic diol does not exceed an amount that causes the tensile elongation at break of the rigid thermoplastic polyurethane to be less than 5 percent.

2. The rigid thermoplastic polyurethane of claim 1 which contains blocks of a high molecular weight glycol that constitute from about 0 to about 10 weight percent of the rigid thermoplastic polyurethane, wherein the high molecular weight glycol has a molecular weight in the range from about 750 to about 6000.

3. The rigid thermoplastic polyurethane of claim 1 wherein the aromatic diol is selected from the group consisting of hydroquinone, 4,4'-dihydroxybiphenyl, 9,9-bis(4-hydroxy-phenyl) fluorene, and bisphenol A.

4. The rigid thermoplastic polyurethane of claim 1 wherein the concentration of the units derived from the aromatic diol is in the range of from about 0.1 to about 10 mole percent based on the total moles of diol used to prepare the rigid thermoplastic polyurethane.

5. The rigid thermoplastic polyurethane of claim 4 wherein the concentration of the units of the aromatic diol is in the range of from about 1 to about 5 mole percent based on the total moles of diol used to prepare the rigid thermoplastic polyurethane.

6. The rigid thermoplastic polyurethane of claim 4 which contains units of:

a) a diisocyanate selected from the group consisting of 4,4'-diisocyanatodiphenylmethane, p-phenylene diisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, and mixtures thereof; and b) a diol chain extender selected from the group consisting of ethylene glycol, 1,3-propanediol, 1,4-butanediol, 1,5-pentanediol, 1,6-hexanediol, diethylene glycol, triethylene glycol, tripropylene glycol, tetraethylene glycol, neopental glycol, 1,4-cyclohexanediol, 1,4-cyclohexanedimethanol, 2,2-bis(β-hydroxy-4-ethoxyphenyl)-propane, and 1,4-bishydroxyethylhydroquinone, and mixtures thereof.

7. The rigid thermoplastic polyurethane of claim 5 which contains units of:

a) a diisocyanate selected from the group consisting of 4,4'-diisocyanatodicyclohexylmethane, and 4,4'-diisocyanatodiphenylmethane, and mixtures thereof; and b) a diol chain extender selected from the group consisting of 1,6-hexanediol, 1,4 butane diol, 1,4-cyclohexanedimethanol, diethylene glycol, triethylene glycol, and tripropylene glycol, and mixtures thereof.

8. A thermoplastic polyurethane having a flex modulus of at least 100,000 psi, and having a sufficient concentration of units of an aromatic diol selected from the group consisting of resorcinol, catechol, hydroquinone, dihydroxynaphthalenes, dihydroxyanthracenes, bis(hydroxyaryl) fluorenes, dihydroxyphenanthrenes, dihydroxybiphenyls, and bis(hydroxyphenyl) propanes to lower the temperature at which the thermoplastic polyurethane can be melt processed, wherein the thermoplastic polyurethane has a $T_g$ of at least 50° C.; and with the proviso that the concentration of the units of the aromatic diol does not exceed an amount that causes the tensile elongation at break of the rigid thermoplastic polyurethane to be less than 5 percent.

9. The thermoplastic polyurethane of claim 8 which contains a filler selected from the group consisting of talc, silica, mica, and glass beads; and/or a reinforcing fiber selected from the group consisting of glass, carbon, and graphite fibers; and/or a thermoplastic selected from the group consisting of acrylonitrile-butadiene-styrene, polyacetal, nylon, polybutylene terephthalate, polyethylene terephthalate, and ionomers.

10. The thermoplastic polyurethane of claim 8 wherein the aromatic diol is selected from the group consisting of hydroquinone, 4,4'-dihydroxybiphenyl, 9,9-bis(4-hydroxyphenyl) fluorene, and bisphenol A.

11. The thermoplastic polyurethane of claim 8 wherein the concentration of the units of the aromatic diol is in the range of from about 0.5 to about 10 mole percent based on the total moles of diol used to prepare the rigid thermoplastic polyurethane.

12. The thermoplastic polyurethane of claim 8 wherein the concentration of the units of the aromatic diol is in the range of from about 1 to about 5 mole percent based on the total moles of diol used to prepare the rigid thermoplastic polyurethane.

13. The thermoplastic polyurethane of claim 8 which contains units of:

a) a diisocyanate selected from the group consisting of 4,4'-diisocyanatodiphenylmethane, p-phenylene diisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, and mixtures thereof; and b) a diol chain extender selected from the group consisting of ethylene glycol, 1,3-propanediol, 1,4-butanediol, 1,5-pentanediol, 1,6-hexanediol, diethylene glycol, triethylene glycol, tripropylene glycol, tetraethylene glycol, neopental glycol, 1,4-cyclohexanediol, 1,4-cyclohexanedimethanol, 2,2-bis(β-hydroxy-4-ethoxyphenyl)-propane, and 1,4-bishydroxyethylhydroquinone, and mixtures thereof.

14. The rigid thermoplastic polyurethane of claim 13 which contains units of:

a) a diisocyanate selected from the group consisting of 4,4'-diisocyanatodicyclohexylmethane, and 4,4'-diisocyanatodiphenylmethane, and mixtures thereof; and b) a diol chain extender selected from the group consisting of 1,6-hexanediol, 1,4 butane diol, 1,4-cyclohexanedimethanol, diethylene glycol, triethylene glycol, and tripropylene glycol, and mixtures thereof.

15. A rigid thermoplastic polyurethane comprising a sufficient concentration of units of an aromatic diol to lower the temperature at which the rigid thermoplastic polyurethane can be melt processed, wherein the thermoplastic polyurethane has a $T_g$ of at least 50° C.; and with the proviso that the concentration of the units of the aromatic diol does not exceed an amount that causes the tensile elongation at break of the rigid thermoplastic polyurethane to be less than 5 percent.

16. The rigid thermoplastic polyurethane of claim 15 wherein the concentration of the units of the aromatic diol is from about 0.1 to about 5 mole percent based on the total moles of diol used to prepare the rigid thermoplastic polyurethane.

* * * * *

UNITED STATES PATENT AND TRADEMARK OFFICE
CERTIFICATE OF CORRECTION

PATENT NO. : 5,574,092
DATED : November 12, 1996
INVENTOR(S) : Steven R. Oriani; Richard W. Oertel It is certified that error appears in the above-identified patent and that said Letters Patent is hereby corrected as shown below:

Claim 12, column 6, line 42 "8" should correctly read - - 11 - -

Claim 13, column 6, line 47 "8" should correctly read - - 11 - -

Signed and Sealed this

Twenty-ninth Day of December, 1998

*Attest:*

BRUCE LEHMAN

*Attesting Officer*    *Commissioner of Patents and Trademarks*